US006964323B2

(12) United States Patent  (10) Patent No.: US 6,964,323 B2
Campbell  (45) Date of Patent: Nov. 15, 2005

(54) QUICK-MOUNT DISC BRAKE ROTOR

(75) Inventor: Darren J. Campbell, Menomonee Falls, WI (US)

(73) Assignee: Hayes Disc Brakes, LLC, Mequon, WI (US)

(*) Notice: Subject to any disclaimer, the term of this patent is extended or adjusted under 35 U.S.C. 154(b) by 0 days.

(21) Appl. No.: 10/810,540

(22) Filed: Mar. 26, 2004

(65) Prior Publication Data

US 2004/0200674 A1 Oct. 14, 2004

Related U.S. Application Data

(60) Provisional application No. 60/458,596, filed on Mar. 28, 2003.

(51) Int. Cl.[7] ............................................. F16D 65/12
(52) U.S. Cl. ........................ 188/18 A; 188/218 XL; 411/251
(58) Field of Search ................. 188/18 A, 218 XL, 188/218 R, 26; 301/111.02, 124.2, 110.5, 6.9; 411/247, 248, 250, 251, 221, 252, 530, 529, 522; 403/354.1, 359.5, 329

(56) References Cited

U.S. PATENT DOCUMENTS

| 637,360 | A | * | 11/1899 | Stark | 411/251 |
|---|---|---|---|---|---|
| 1,172,722 | A | * | 2/1916 | Millard | 411/251 |
| 2,612,968 | A | | 10/1952 | Hood | 188/26 |
| 3,675,741 | A | | 7/1972 | Frei et al. | 188/26 |
| 3,927,736 | A | | 12/1975 | Bergles | 188/26 |
| 4,109,762 | A | | 8/1978 | Wood | 188/26 |
| 4,170,369 | A | | 10/1979 | Strutman | 280/261 |
| 4,179,013 | A | | 12/1979 | Kine | 188/26 |
| 4,303,149 | A | * | 12/1981 | Lech, Jr. | 192/70.19 |
| 5,318,353 | A | | 6/1994 | Frick | 301/105.1 |
| 5,433,306 | A | | 7/1995 | Yang | 192/64 |
| 5,437,351 | A | | 8/1995 | Lindner | 188/18 |
| 5,452,381 | A | | 9/1995 | Guerra | 384/545 |
| 5,518,302 | A | | 5/1996 | Bernoni | 301/105.1 |
| 5,720,530 | A | | 2/1998 | Holsnijders et al. | 301/105.1 |
| 6,206,144 | B1 | | 3/2001 | Di Bella | 188/26 |
| 6,330,937 | B1 | * | 12/2001 | Dagh et al. | 188/18 A |
| 6,336,531 | B1 | | 1/2002 | Chou | 188/218 |
| 6,371,252 | B1 | | 4/2002 | Kanehisa | 188/26 |

FOREIGN PATENT DOCUMENTS

| DE | 32 16 108 A1 | 12/1982 | F16D/65/12 |
|---|---|---|---|
| DE | 197 51 522 C1 | 5/1999 | F16D/65/12 |
| EP | 1217248 A1 | 6/2002 | F16D/65/12 |
| WO | 03/100281 A1 | 12/2003 | F16D/65/12 |

* cited by examiner

Primary Examiner—Matthew C. Graham
(74) Attorney, Agent, or Firm—Whyte Hirschboeck Dudek SC

(57) ABSTRACT

A quick mount disk brake rotor is configured for use with a splined hub of a bicycle or the like. The rotor includes a splined rotor carrier that slides over the splined hub and a rub area positioned outwardly from the rotor carrier. The rotor carrier also includes slots which are alignable with a receptacle such as a groove on the hub. A retainer clip is biased through the slots in the rotor carrier and into the groove in the hub to axially lock the rotor to the hub. The clip includes a pair of outwardly extending ends that can be squeezed together to drive the clip out of the groove on the hub against the inherent bias of the clip to enable the rotor to be removed from the hub in a quick and simple manner. The result is a biased retaining member is disengageable from the brake rotor carrier so as to move brake rotor carrier from frictional contact with the retained brake hub by tool-free compression of the biased retaining member.

20 Claims, 21 Drawing Sheets

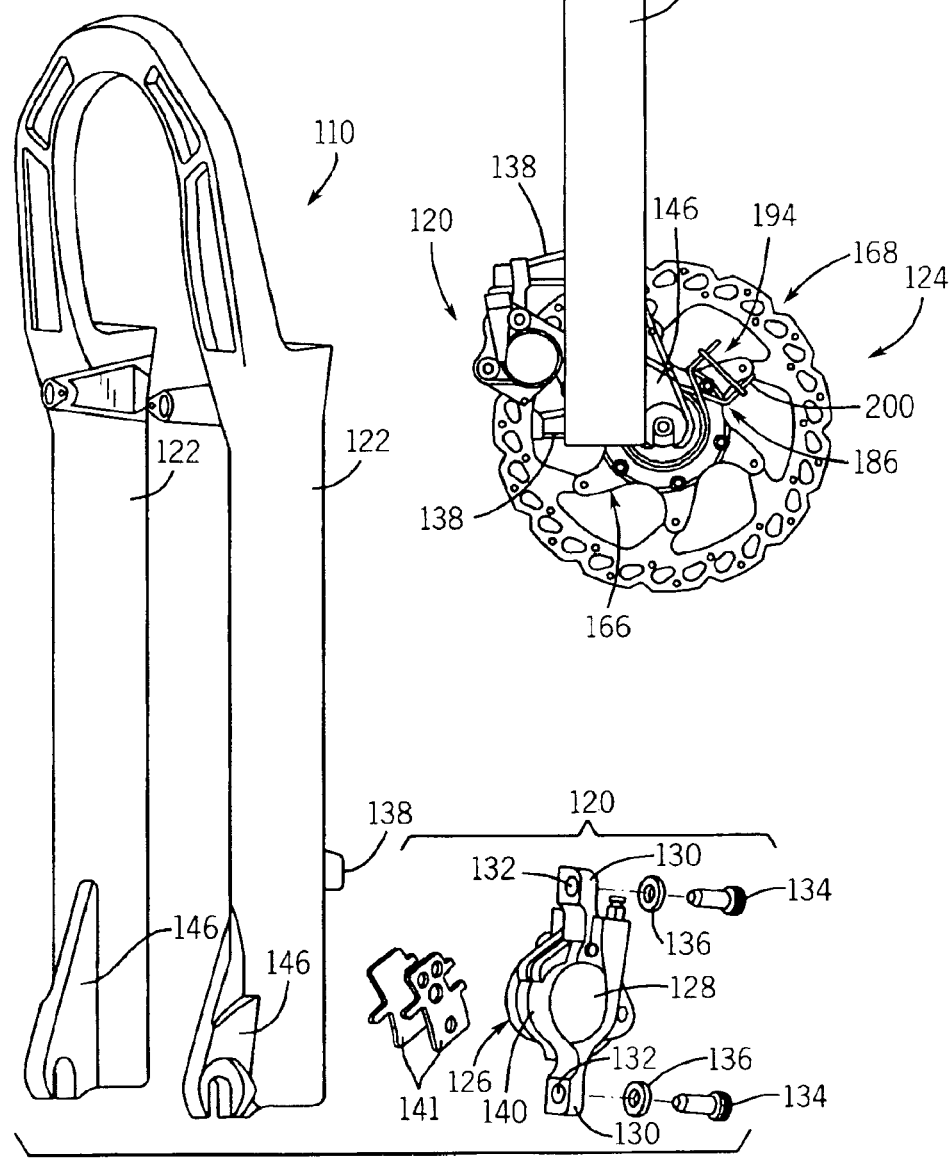

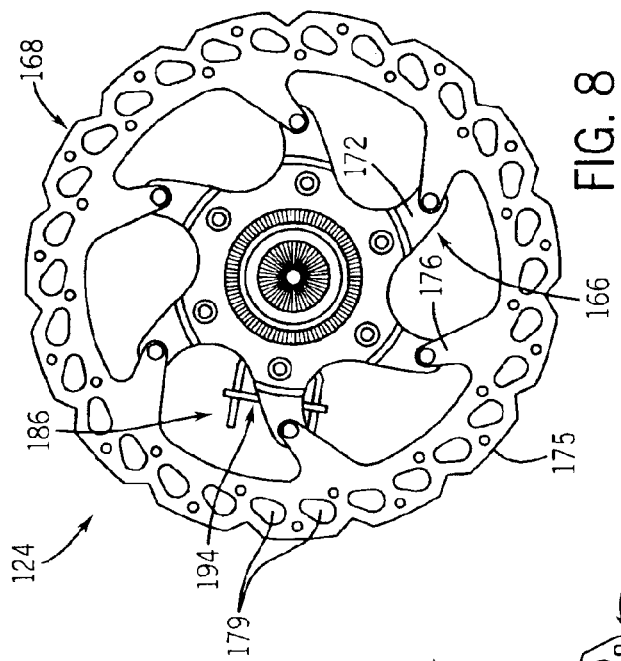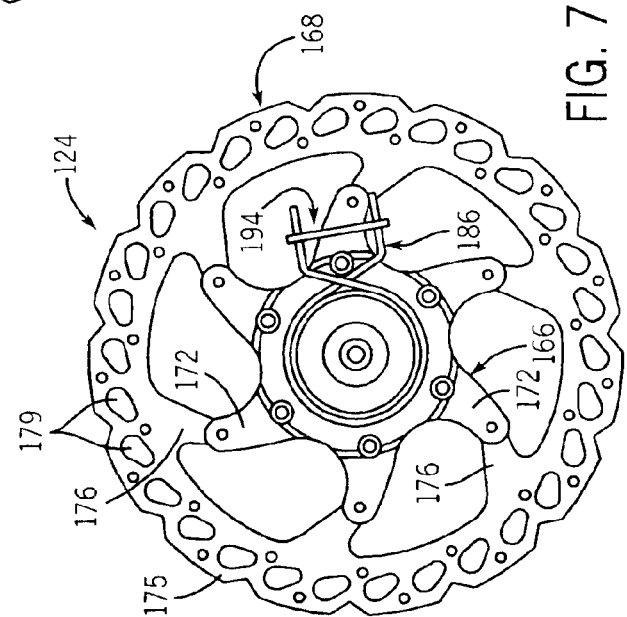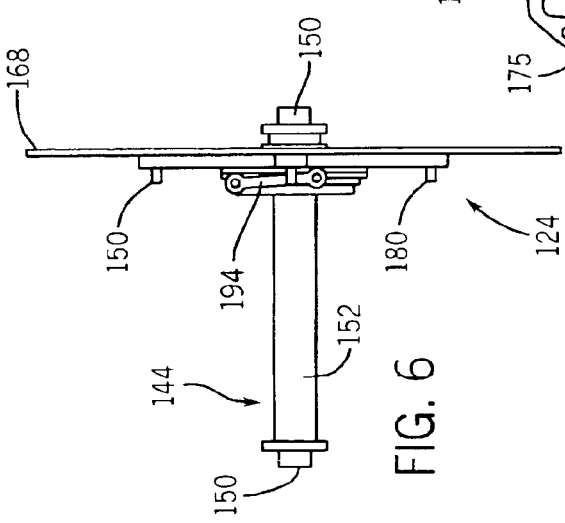

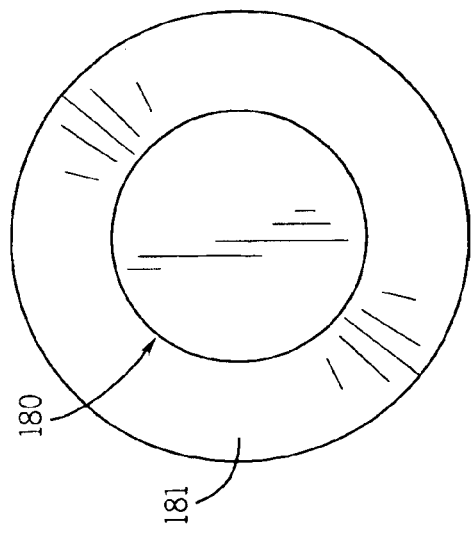
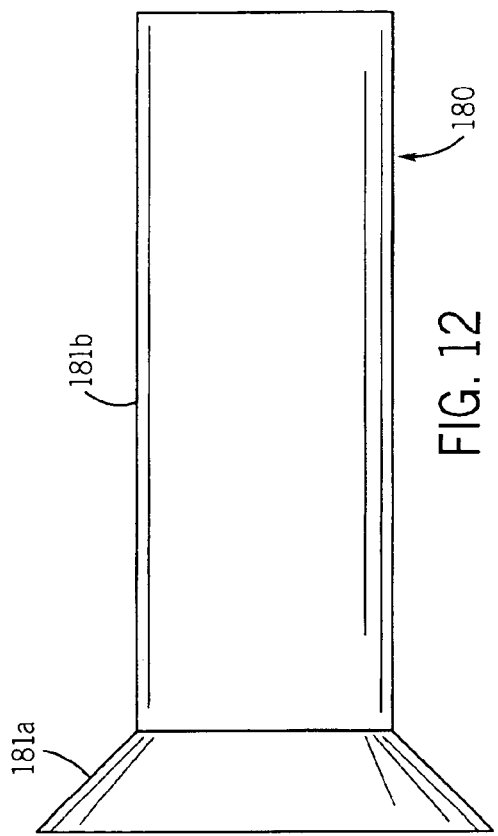
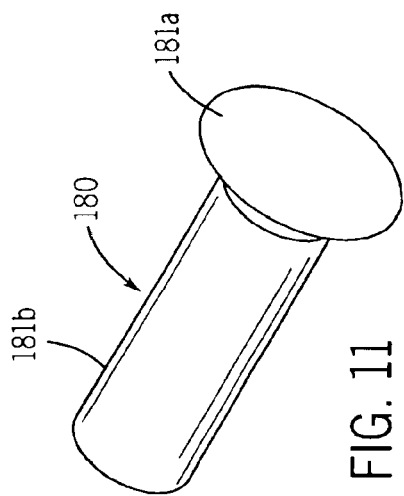
FIG. 13
FIG. 12
FIG. 11

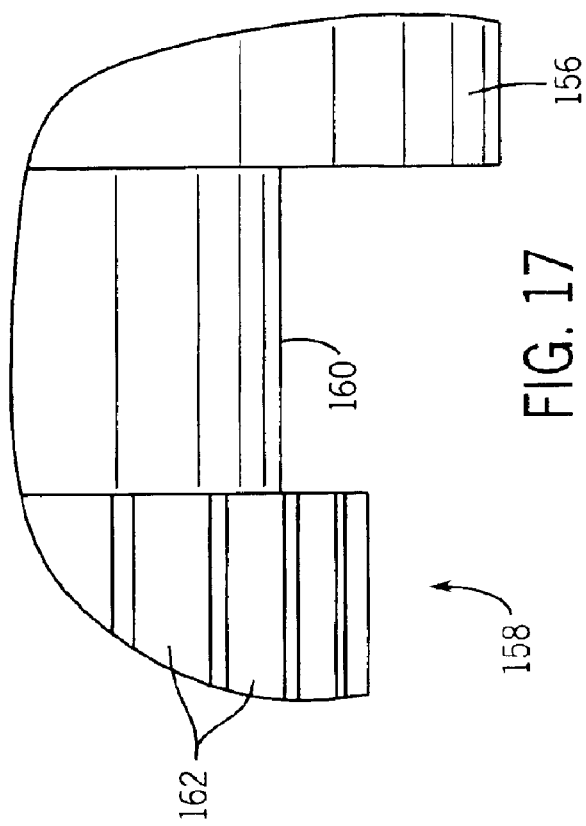
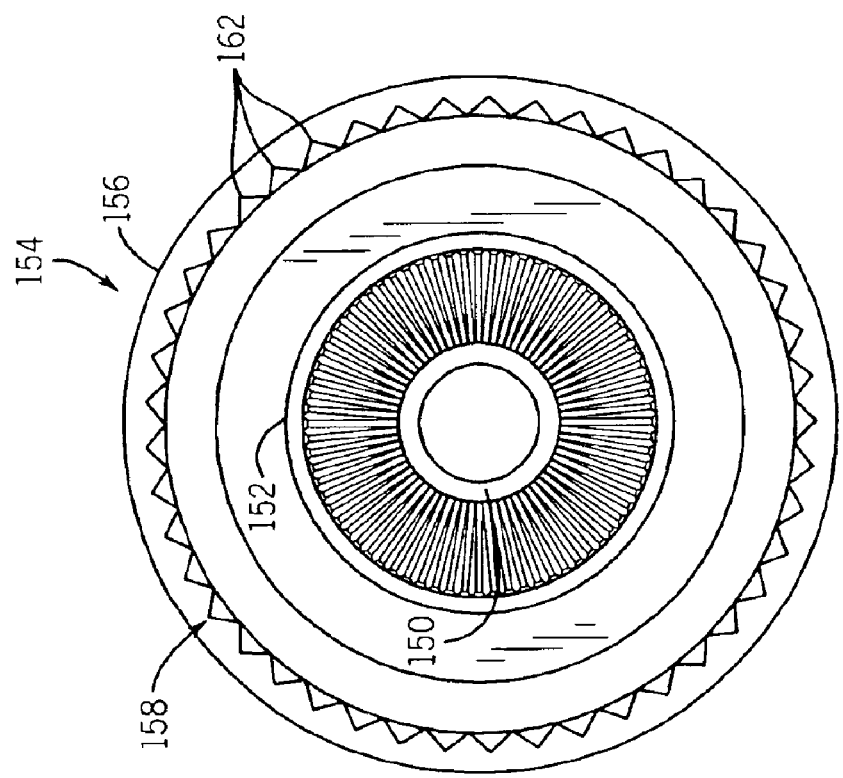
FIG. 17
FIG. 16

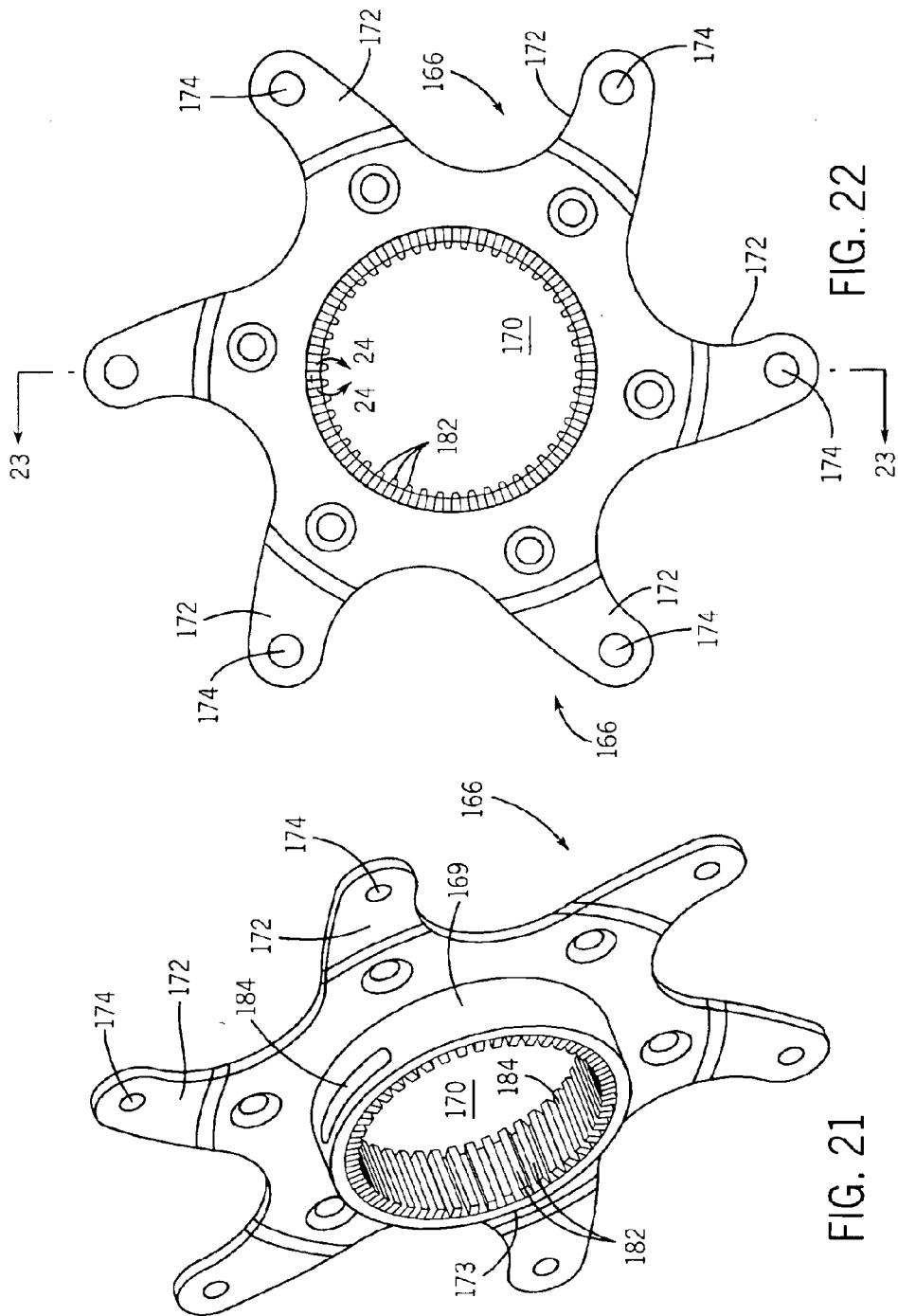

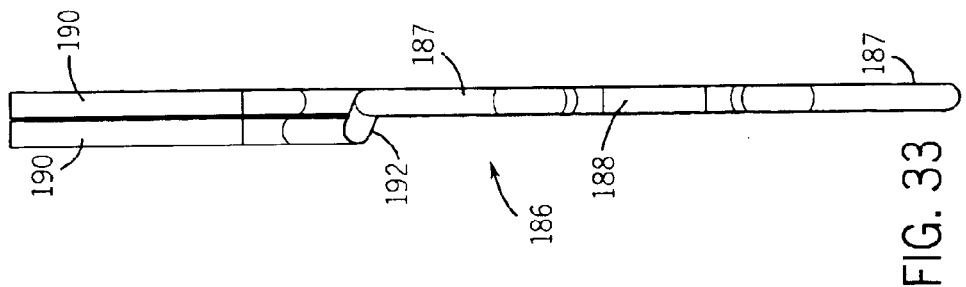
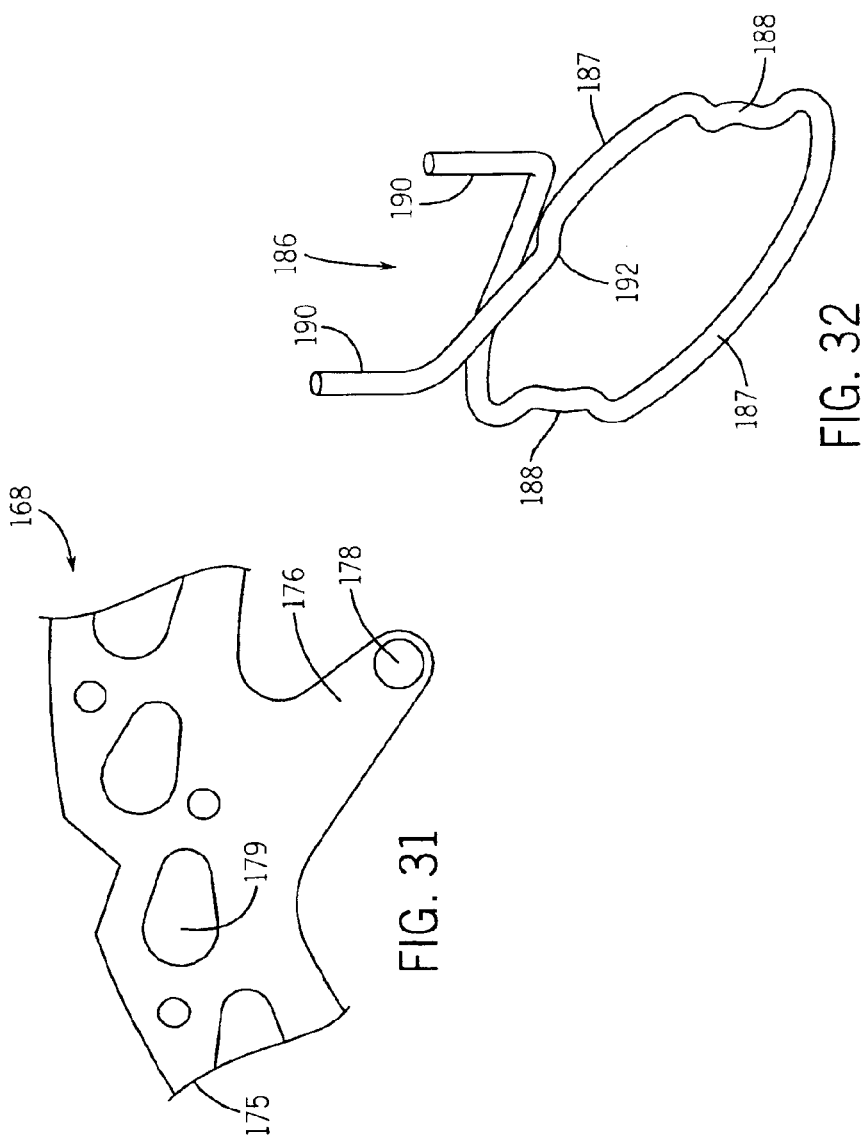

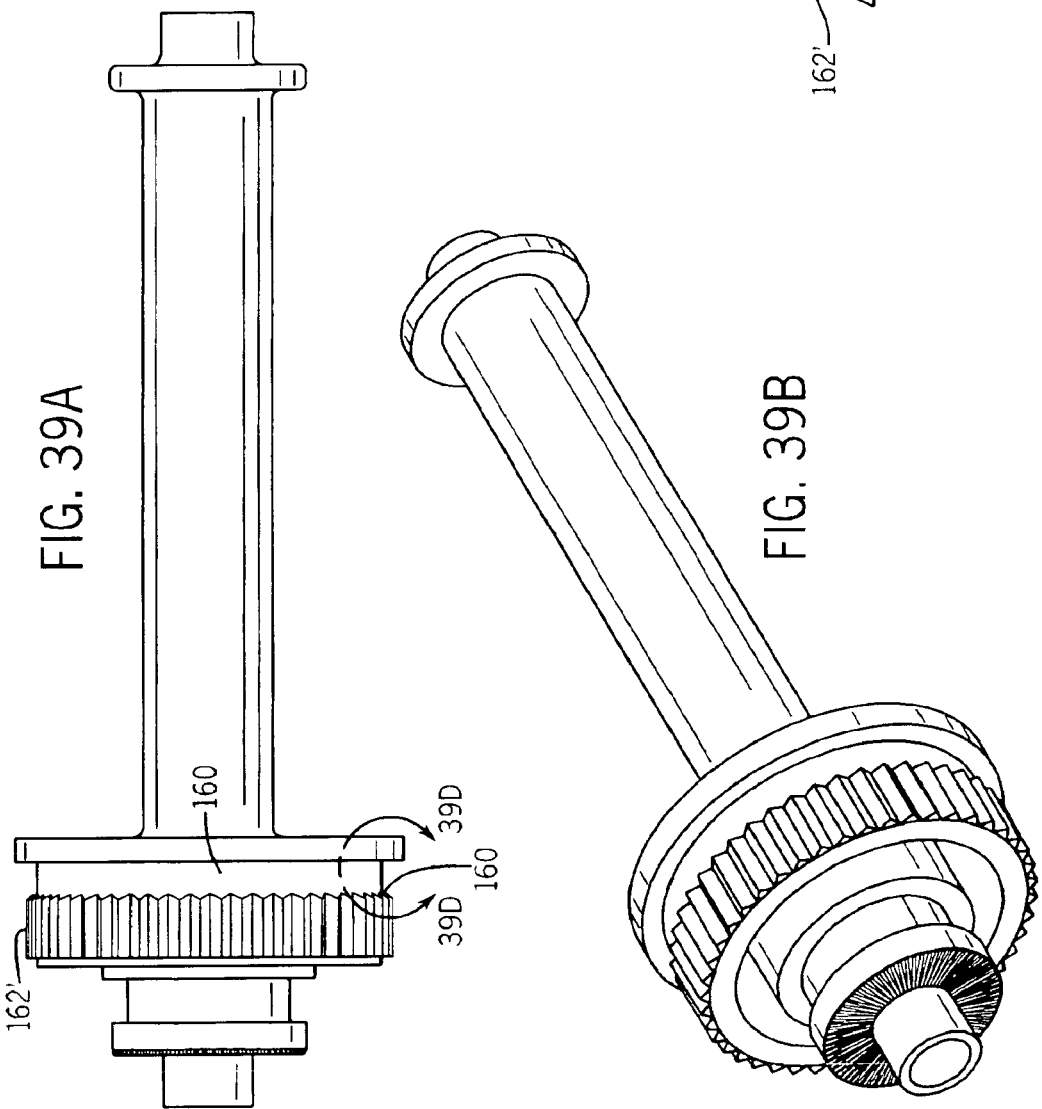

QUICK-MOUNT DISC BRAKE ROTOR

CROSS REFERENCE TO RELATED APPLICATIONS

This application claims the benefit of U.S. provisional application Ser. No. 60/458,596 filed on Mar. 28, 2003, the teachings and disclosures of which are herein incorporated by reference.

BACKGROUND OF THE INVENTION

1. Field of the Invention

The present invention relates to disc brake assemblies, and more specifically to a disc brake rotor that can be secured to a hub using a quick-release mechanism. It additionally is related to a disc brake assembly having such a rotor.

2. Discussion of the Related Art

Disc brake assemblies are attached to wheel hubs in order to provide a mechanism for braking the wheel of a vehicle. With particular regard to bicycles, the disc brake assembly normally includes a rotor including an inner rotor carrier that is mounted on the hub and an outer rub area. The rub area and the carrier may be integrated or formed from connected components. Further, a braking mechanism, such as a brake caliper having opposed brake pads, is engageable with the rotor by selectively pressing the pads against the rub area.

In order to make disc brake assemblies more adaptable for use with bicycles, a number of prior art assemblies have been developed. However, a shortcoming of the majority of these bicycle disc brake assemblies is that the rotor is fixedly attached to the hub in a manner which does not allow the rotor to be easily attached to or removed from the hub. This can be problematic, particularly if field replacement is required.

One prior art design for a bicycle disc brake assembly that enables the rotor disc to be quickly removed from the bicycle hub is disclosed in Kanehisa U.S. Pat. No. 6,371,252, which is incorporated herein by reference. In this design, the rotor carrier includes a splined inner surface which is positionable around a complementary splined end of a bicycle hub such that the carrier, and hence the rotor as a whole, rotate in conjunction with the hub. The carrier is held on the end of the hub by a separate locking ring having a threaded section disposed on one side of the ring. The locking ring is insertable through the rotor carrier to threadedly engage mating threads in the interior of the hub, such that the rotor carrier is retained on the hub between the locking ring and the hub.

However, the step of threading the locking ring into engagement with the hub is time consuming and can sometimes be difficult, as the locking ring needs to be properly aligned with the hub in order for the locking ring to securely engage the hub. A special tool is also required to thread the locking ring onto and off of the hub, further hindering assembly.

Therefore, it is desirable to develop a disc brake rotor that can be easily mounted on and removed from a splined hub without any tools. It is also desirable to develop a quick mount disc brake rotor that has fewer pieces than previously-available rotors.

SUMMARY OF THE INVENTION

In accordance with a preferred aspect of the invention, a disc brake rotor is securable to a hub by a biased securing member that is engageable between the rotor and the hub in order to affix the rotor on the hub until such time as an individual disengages the securing member from the hub. The hub includes a splined section at one end that is mateable with a splined interior portion of a central opening in the rotor.

The biased securing member used to affix the rotor carrier to the splined section of the hub may comprise a retainer clip, preferably a wire form. The preferred retainer clip is configured to extend through at least one slot in a carrier of the rotor and engage a corresponding receptacle on the hub. The receptacle may, for instance, comprise a groove in the outer periphery of a rotor mount portion of the hub. In this case, the retainer clip may have 1) a generally circular body positionable around the rotor carrier and 2) a pair of overlapping ends positioned adjacent one another on one side of the body. The body of this retainer clip has one or more engaging portions that are positionable within opposed slots formed in the rotor carrier. When the rotor is installed on the hub, the inherent bias of the wire clip forces the engaging portions through the corresponding slots in the rotor carrier and into the mating groove in the outer periphery of the hub, thereby locking the rotor to the hub. The rotor can be removed from the hub simply by urging the ends of the retainer clip towards one another, against the inherent bias of the clip, to drive the engaging portions out of the groove, at which time the splined rotor carrier can slide off from the splined hub. To install the rotor on the hub, the splines on the rotor carrier and the hub are aligned with one another and the rotor carrier is forced onto the hub (while squeezing the retainer clip ends together to provide clearance for the engaging portions to ride over the splines of the hub, if necessary) until the engaging portions of the retaining clip snap into the groove in the hub. No tools are required for either assembly or disassembly. Once assembly is complete, the inherent bias of the retainer clip functions to continually urge the opposed engaging portions further into the groove in the hub during operation of the bicycle to provide an even more secure engagement between the rotor carrier and the hub.

The retainer clip can be prevented from being inadvertently disengaged by the movement of the spring ends with regard to one another by the placement of a retainer or locking bar between the opposed ends of the retainer clip. The bar is fixed to one of the ends of the retainer clip and is removably engageable with the opposite end such that the bar can fix the ends to one another during the operation of the bicycle. When the bar is disengaged from one end, the clip ends can be moved with respect to one another in order to flex the retainer clip and disengage the rotor carrier from the hub and rotor carrier.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 is a rear view of the front fork, braking member and disc brake assembly of FIG. 2;

FIG. 5 is an exploded view of the front fork and braking member for use with the disc brake assembly of the present invention;

FIG. 6 is a side view of the disc brake assembly of the present invention;

FIG. 7 is a rear view of the disc brake assembly of FIG. 6;

FIG. 8 is a front view of the disc brake assembly of FIG. 7;

FIG. 11 is a perspective view of a rivet for use in the present invention;

FIG. 12 is a side elevation view of the rivet of FIG. 11;

FIG. 13 is a rear elevation view of the rivet of FIG. 11;

FIG. 16 is an end view of the hub portion of FIG. 14;

FIG. 17 is an enlarged sectional view of the hub portion taken along line 17—17 of FIG. 15;

FIG. 21 is a rear perspective view of the rotor carrier for use in the disc brake assembly of the present invention;

FIG. 22 is a front view of the rotor carrier of FIG. 21;

FIG. 31 is an enlarged partial view of the rotor taken along line 31—31 of FIG. 30;

FIG. 32 is a perspective view of the retainer clip for use in the disc brake assembly of the present invention;

FIG. 33 is a side view of the retainer clip of FIG. 32;

FIG. 39A is a front view of a second embodiment of a hub for use in the disc brake assembly of the present invention;

FIG. 39B is a perspective view of the hub of FIG. 39A;

FIG. 39C is a side view of the hub of FIG. 39B;

FIG. 39D is an enlarged partial view of the hub taken along line 39D—39D of FIG. 39A;

DETAILED DESCRIPTION OF THE PREFERRED EMBODIMENTS OF THE INVENTION

Figure 1:
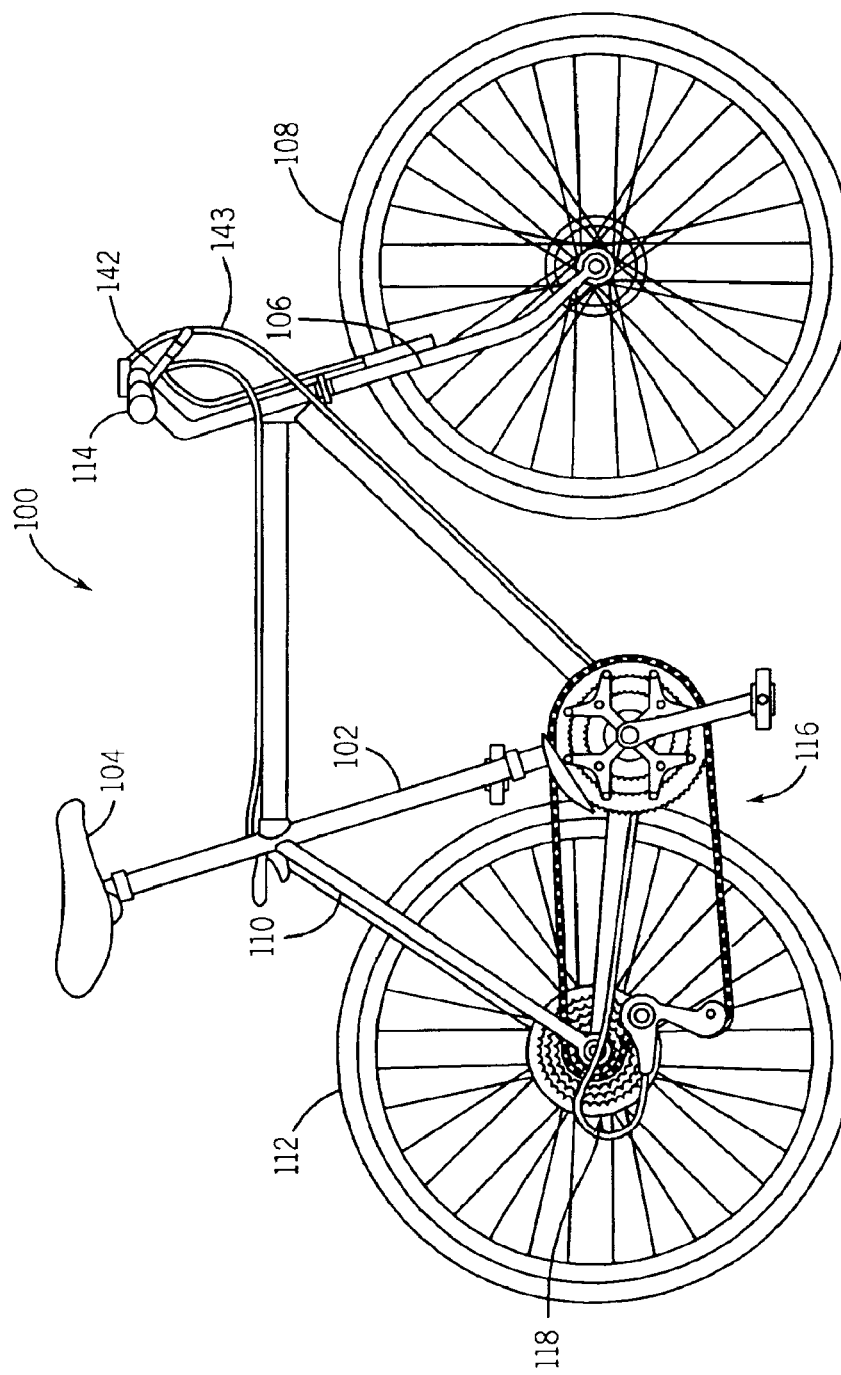
FIG. 1 is a side elevation view of a bicycle including the disc brake assembly of the present invention.
Figure 2:
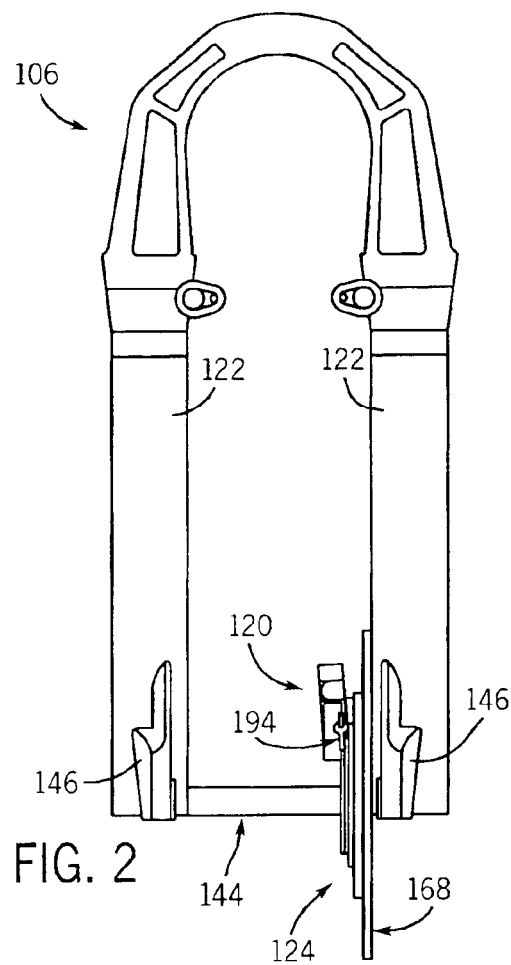
FIG. 2 is a front view of the front fork and a braking member with the disc brake assembly of the present invention.
Figure 3:
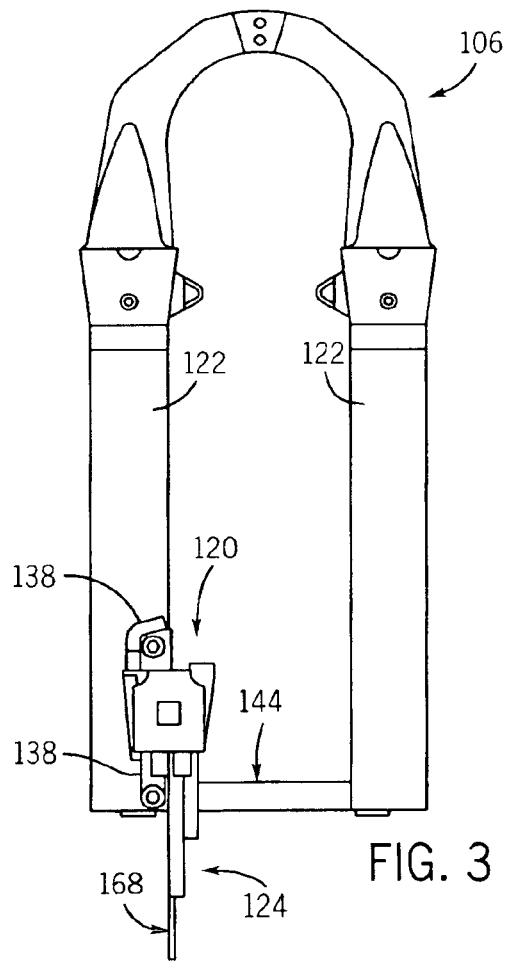
FIG. 3 is a side elevation view of a front fork, braking member and disc brake assembly of FIG. 2.
Figure 9:
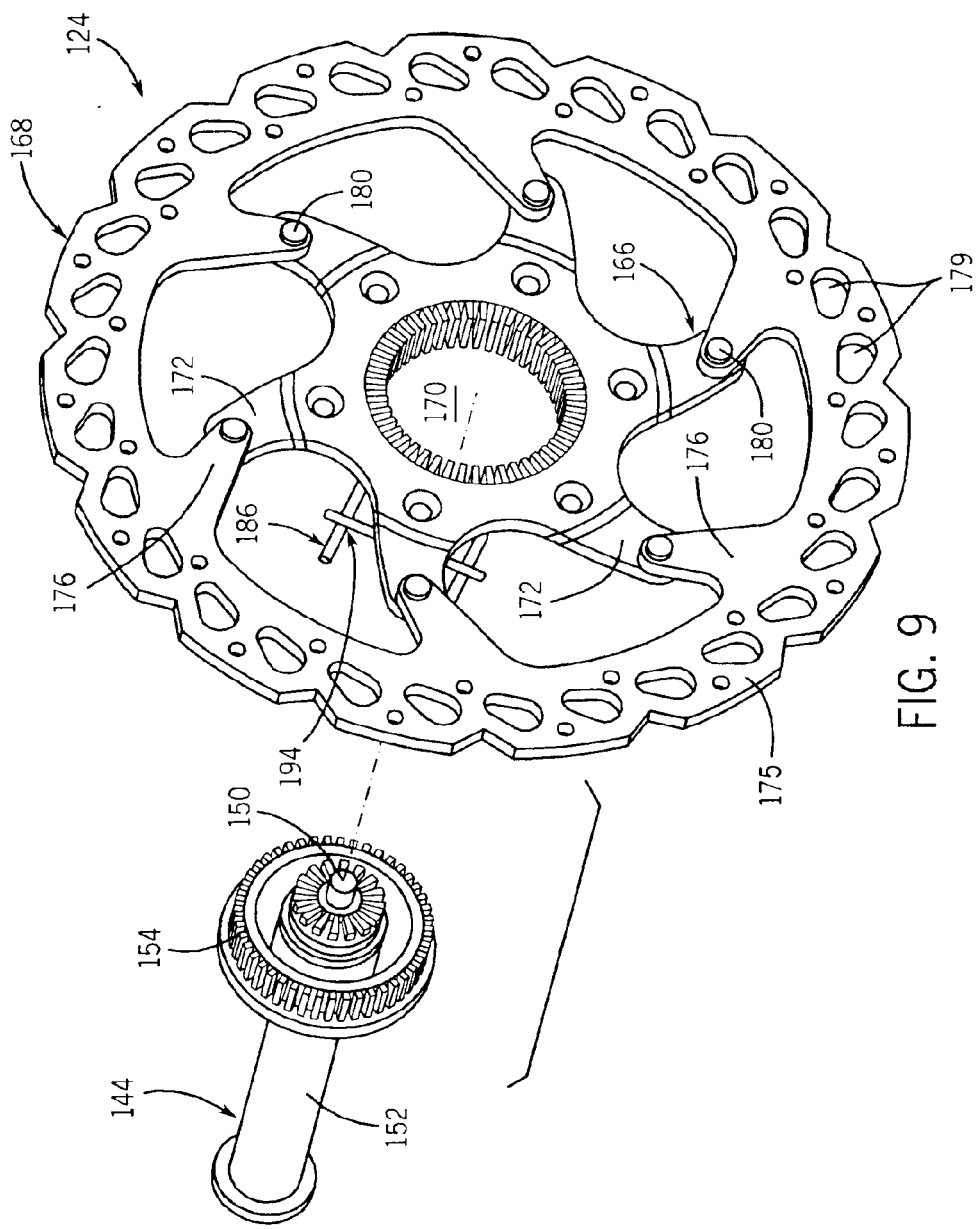
FIG. 9 is a perspective view of the hub and rotor of the present invention.
Figure 10:
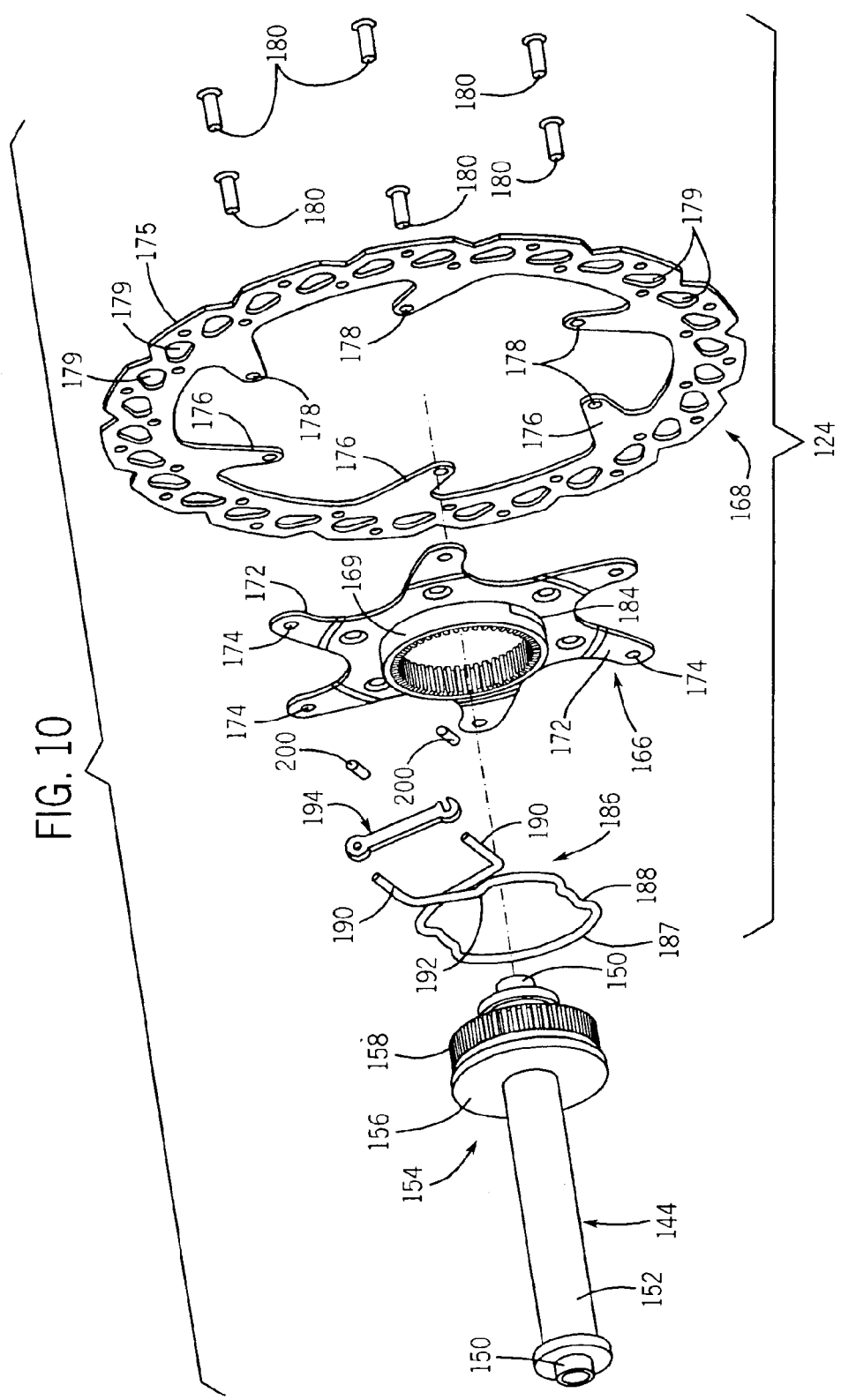
FIG. 10 is an exploded view of the disc brake assembly of the present invention.
Figure 15:
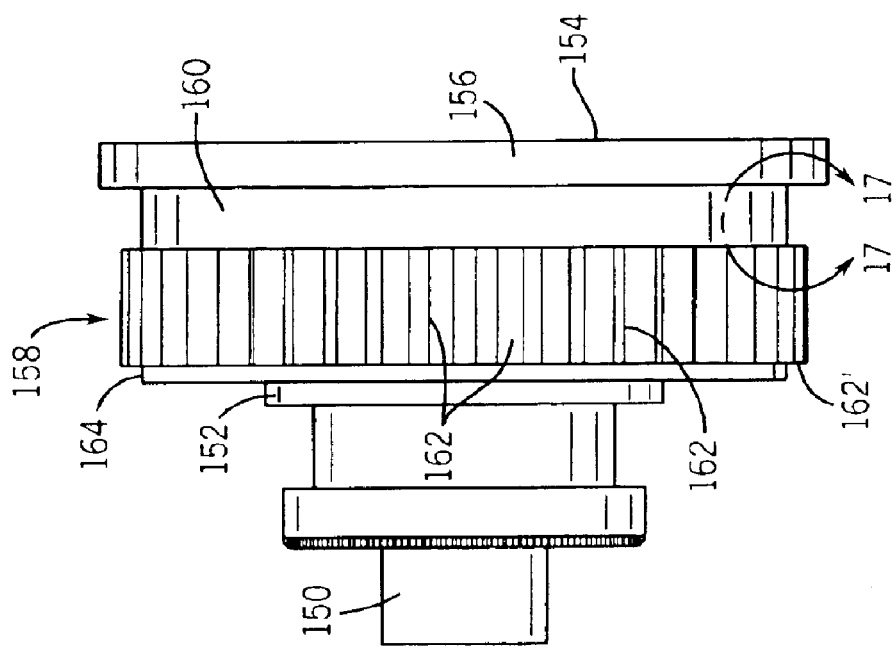
FIG. 15 is a plan view of the hub portion of FIG. 14.
Figure 14:
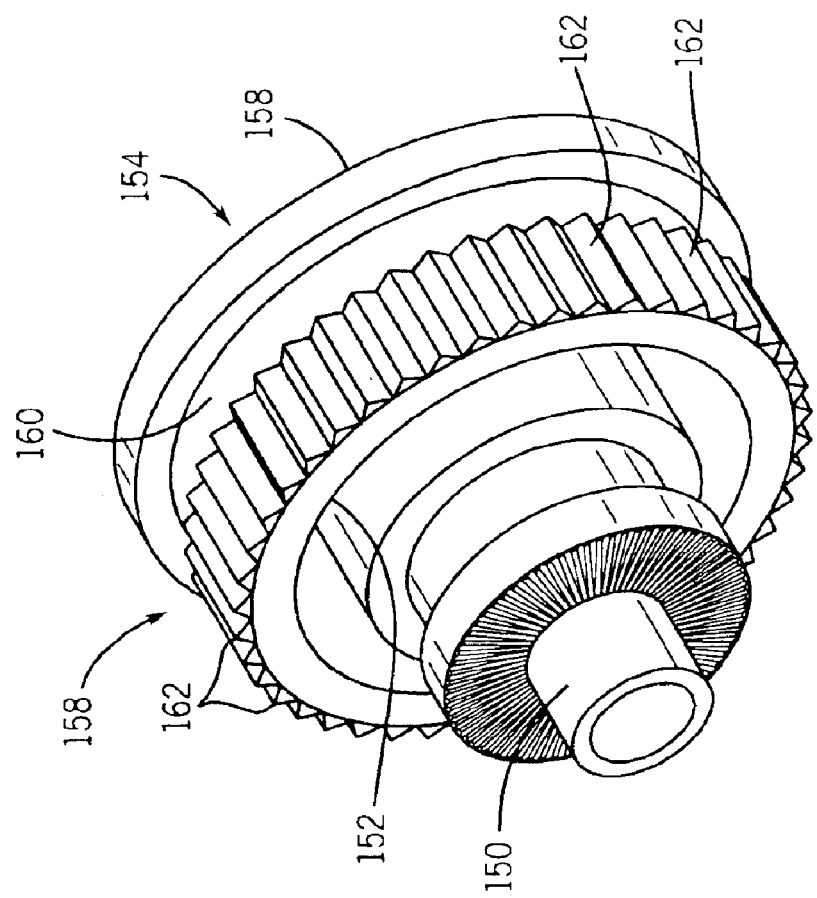
FIG. 14 is a perspective view of a portion of a hub for use in the disc brake assembly of the present invention.
Figure 19:
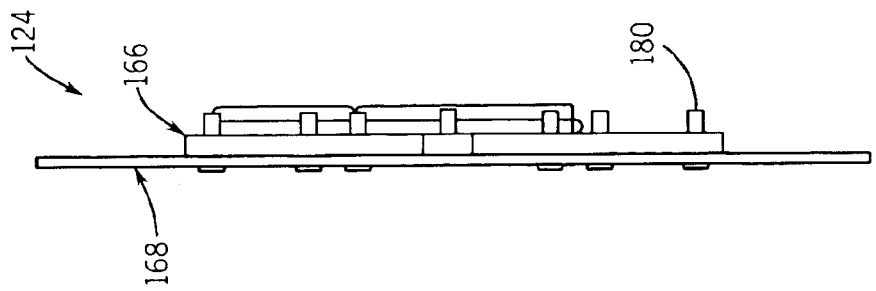
FIG. 19 is a side view of the disc brake rotor and rotor carrier with retainer clip of FIG. 18.
Figure 18:
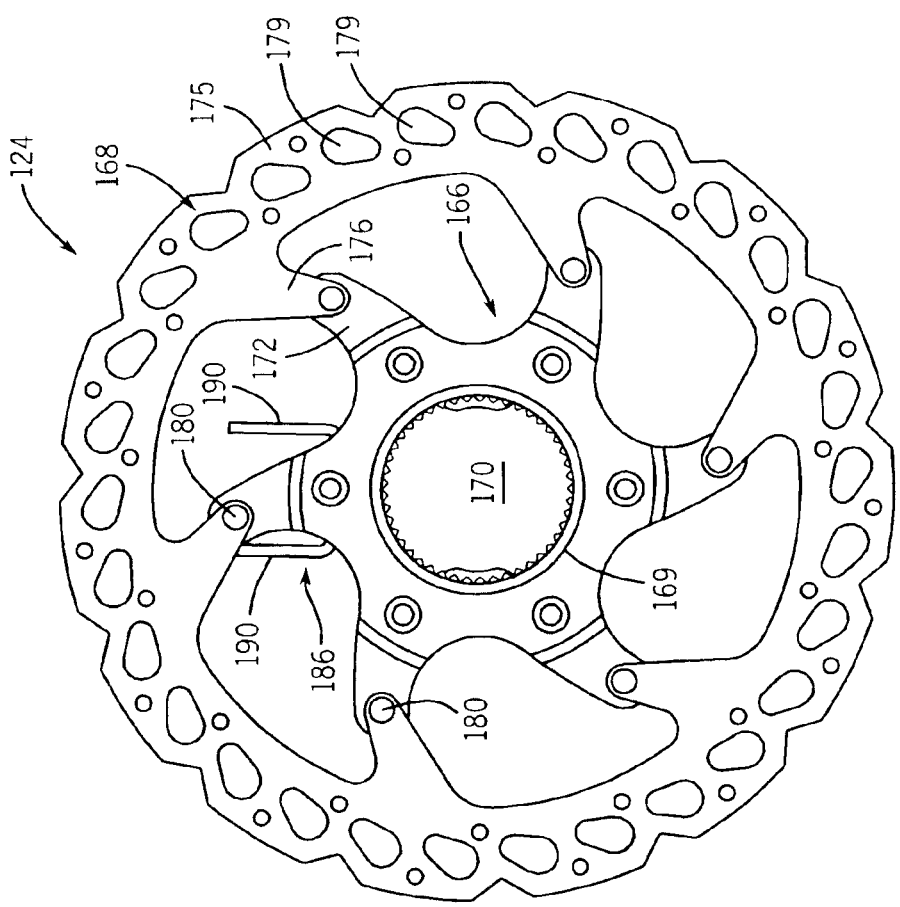
FIG. 18 is a front view of the disc brake rotor and rotor carrier with retainer clip for use in the disc brake assembly of the present invention.
Figure 20:
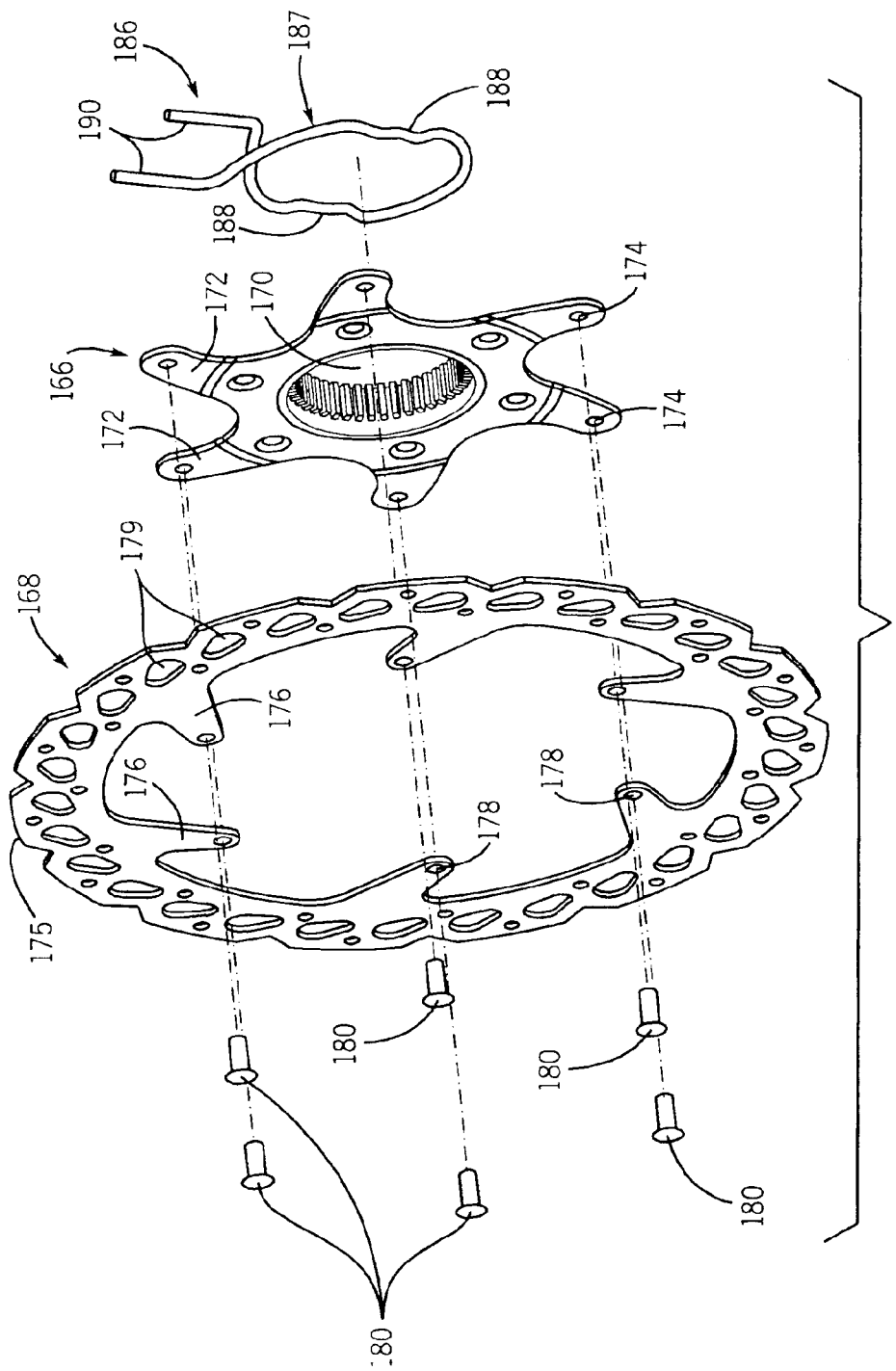
FIG. 20 is a perspective exploded view of the disc brake rotor and rotor carrier with retainer clip of FIG. 18.
Figure 24:
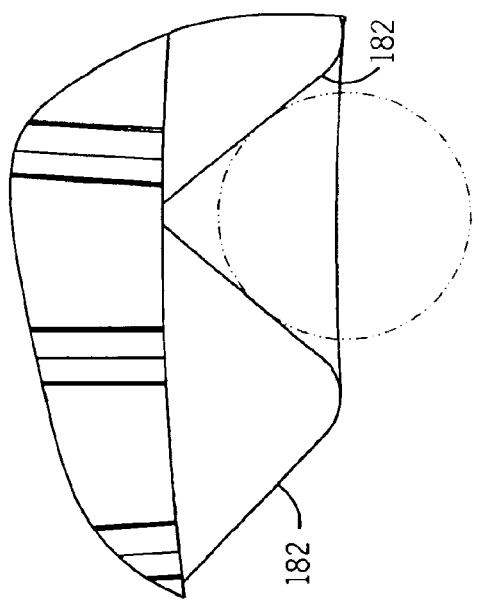
FIG. 24 is a partial enlarged view taken along line 24—24 of FIG. 22.
Figure 25:
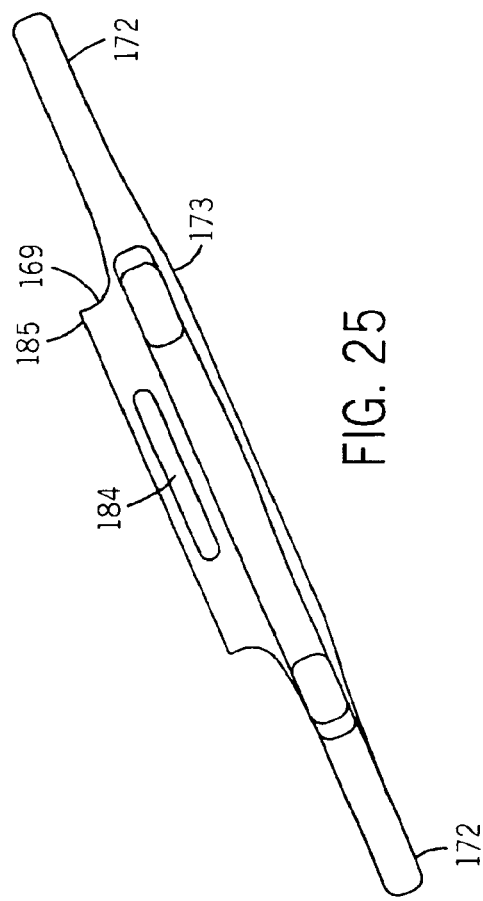
FIG. 25 is a side view of the rotor carrier of FIG. 21.
Figure 23:
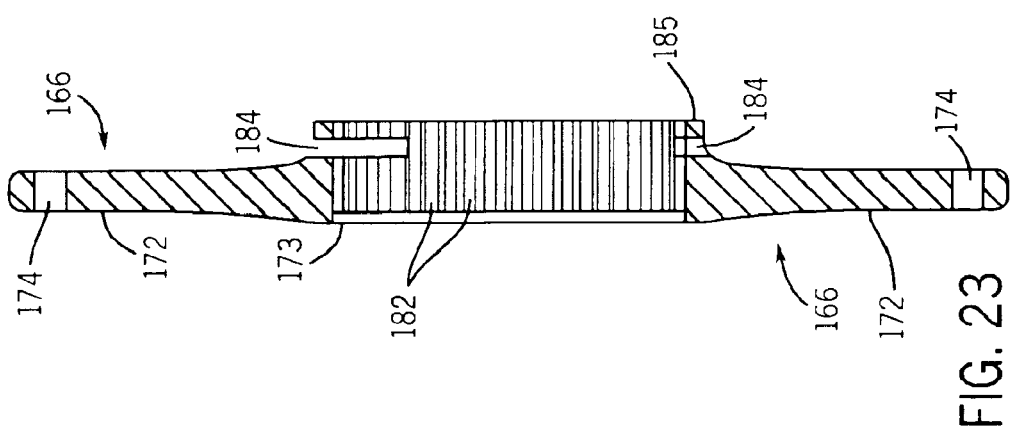
FIG. 23 is a side sectional of the rotor carrier taken along line 23—23 of FIG. 22.
Figure 27:
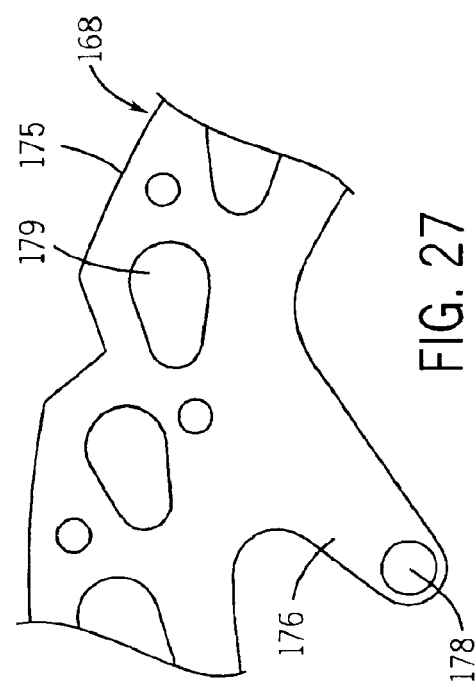
FIG. 27 is an enlarged partial view of the rotor taken along line 27—27 of FIG. 26.
Figure 26:
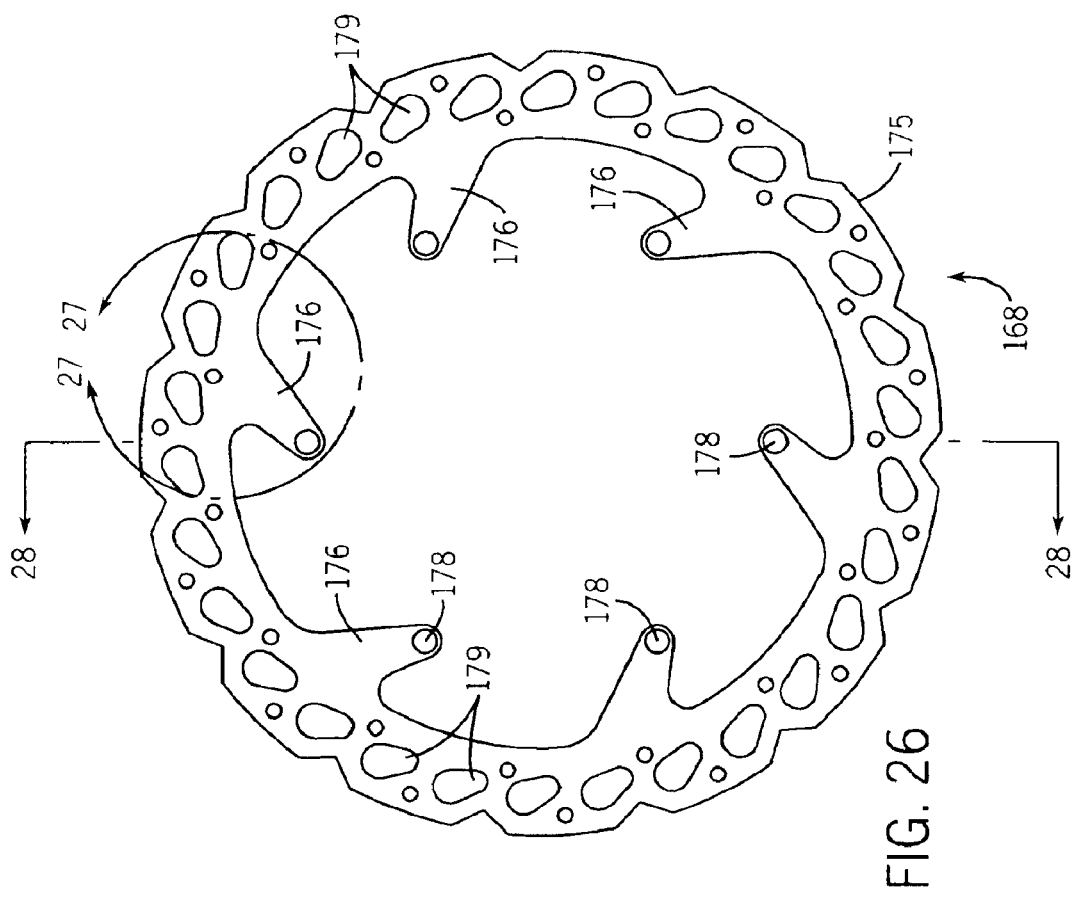
FIG. 26 is a rear view of the rotor for use in the disc brake assembly of the present invention.
Figure 30:
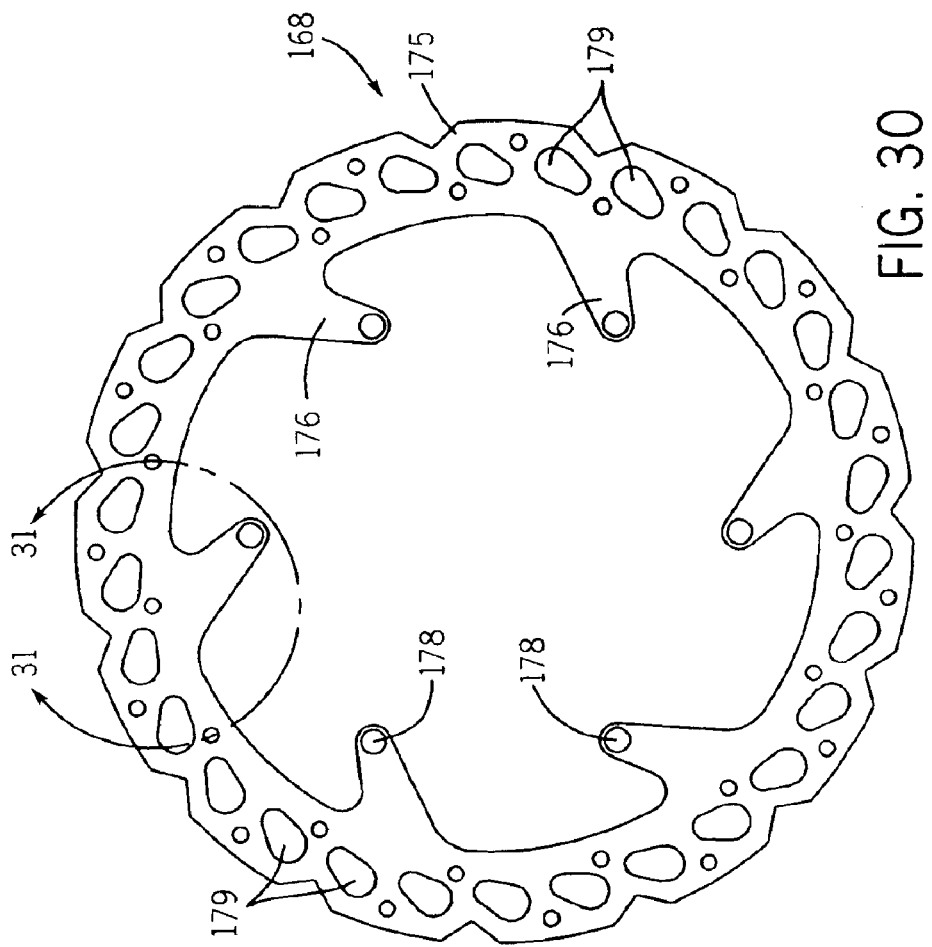
FIG. 30 is a front view of the rotor of FIG. 26.
Figure 29:
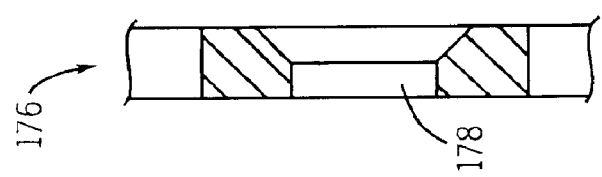
FIG. 29 is an enlarged partial sectional view of the rotor taken along line 29—29 of FIG. 28.
Figure 28:
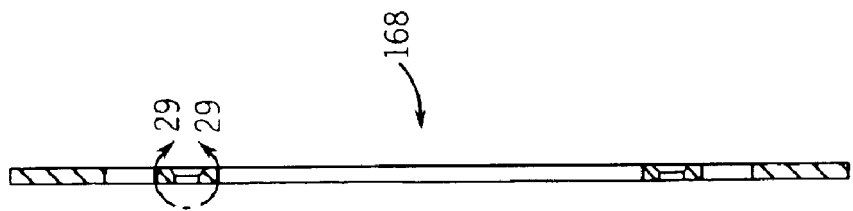
FIG. 28 is a side sectional view of the rotor taken along line 28—28 of FIG. 26.
Figure 35:
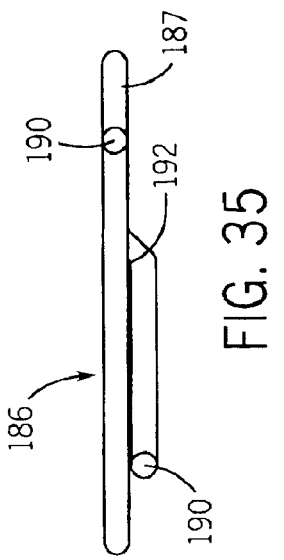
FIG. 35 is a top plan view of the retainer clip of FIG. 32
Figure 34:
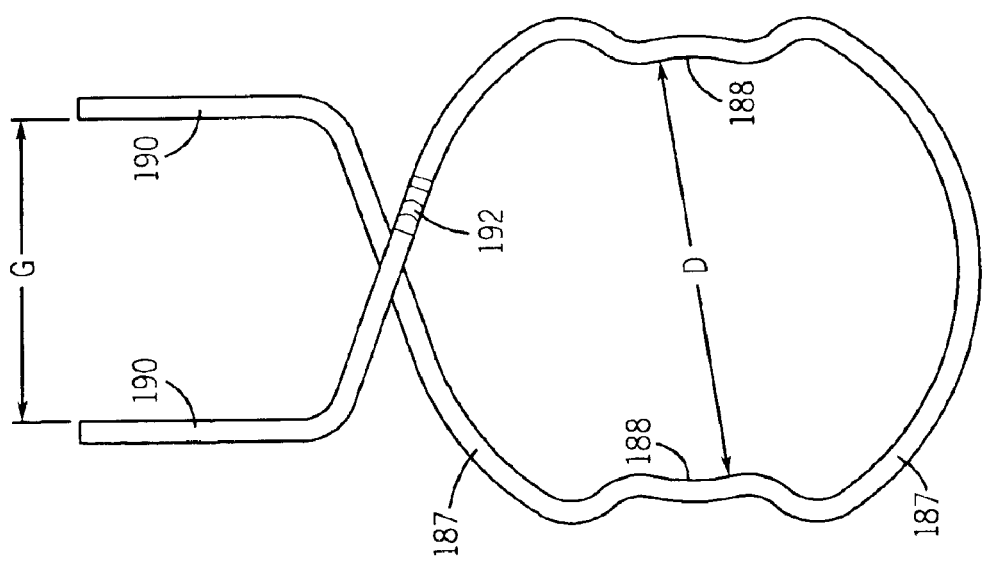
FIG. 34 is a front view of the retainer clip of FIG. 32.

With regard now to the drawing figures in which like reference numerals designate like parts throughout the disclosure, in FIG. 1 a bicycle 100 is illustrated that includes a frame 102 including a seat 104, a front fork 106 connected to a front wheel 108, and a rear fork 110 connected to a rear wheel 112. The bicycle 100 also includes a handlebar 114 connected to the front fork 106, the handlebar used to steer the bicycle 100, and a drive train 116 connected between the rear wheel 112 and the frame 102 that is used to propel the bicycle 100.

Referring now to FIGS. 1–6, the bicycle 100 also includes a disc brake assembly 118. While the disc brake assembly 118 can be used to brake either or both of the front wheel 108 and rear wheel 112, in the preferred embodiment shown in the drawing figures, the assembly 118 of this embodiment brakes only the front wheel 108. The assembly 118 includes a braking member 120 affixed to one of the arms 122 of the front fork 106, and a rotor 124 mounted to the front wheel 108 and engageable by the braking member 120. Pursuant to a preferred embodiment, the rotor 124 is mounted on a splined hub 144 of the front wheel 108 and locked from axial movement relative to the hub 144 by a retainer clip 186 disposed on the inboard side of the rotor 124. The rotor 124, hub 144, and retainer clip 186 are all detailed below.

As best shown in FIG. 5, the braking member 120 can be any conventional disc braking mechanism, but is preferably formed as a brake caliper 126 including a central body 128 and a pair of mounting arms 130 extending outwardly from opposite sides of the body 128. Each of the arms 130 includes a central opening 132 through which is inserted a bolt 134 that is also inserted through a washer 136 aligned with the opening 132. Each bolt 134 passes through the openings 132 into engagement with one of a pair of caliper mounts 138 positioned on or integrally formed with the fork arm 122.

Referring to FIGS. 1 and 5, the body 128 of the caliper 126 is formed of a rigid material, such as metal or hard plastic, and includes a slot 140 in which are positioned a pair of caliper brake pads 141 on opposite sides of the slot 140. Movement of a lever 142 (FIG. 1) on the handlebar 114 serves to mechanically displace a cable 143 (FIG. 1) extending from the lever 142 to the brake caliper 126 to drive the brake pads 141 towards one another across the slot 140 to engage the rotor 124 to brake the bicycle 100. This "mechanical" actuator could be replaced by a hydraulic actuator in the form of a master cylinder.

Looking now at FIGS. 5–10 and 14–31, the hub 144 of the front wheel 108 on which the rotor 124 is mounted is secured between a pair of hub mounts 146 disposed on or integrally formed with each of the fork arms 122. The hub 144 can be any conventional hub design including a fixed inner tubular member (not shown) that is secured at opposite ends to the hub mounts 146 in a known manner, and a rotatable outer tubular member 152 positioned around the fixed inner member, such as by conventional bearing assemblies (not shown). At one end of the rotatable outer member 152 adjacent the braking member 120, the hub 144 includes a rotor mount 154. The rotor mount 154 is formed from a rigid material, such as a metal or hard plastic, either as a separate piece from the outer member 152 or integrally with the outer member 152. The rotor mount 154 includes a radially extending portion 156 affixed to the outer member 152 and a tubular portion 158 extending axially outwardly from an inner surface of the radial portion 156. A groove 160 is formed in the outer periphery of the tubular portion 158 adjacent its inner end. The groove 160 could be segmented but preferably extends completely around the rotor mount 154. The tubular portion 158 includes a number of axial splines 162 positioned peripherally about the tubular portion 158 and extending axially outwardly away from the radial portion 156. Each spline 162 can also have a chamfered end 163 (FIG. 7) opposite the groove 160 which extends from the splines 162 across a leading edge 164 of the tubular portion 158 to provide a push on surface on the rotor 124 as described below.

The rotor 124 includes a rotor carrier 166 secured to an outer ring 168 presenting the rotor's rub area. The carrier 166 is formed of a rigid material. The carrier 166 is generally circular in shape, and defines a sleeve 169 having a central opening 170 and a number of equidistantly spaced mounting arms 172 extending at least generally radially away from the outer periphery of the outer axial end 171 of the sleeve 169. The arms 172 have mounting openings 174 formed adjacent their outer ends Similar to the carrier 166, the ring 168 is preferably formed of a rigid material, such as a metal. The ring 168 is also generally circular in shape having an outer rub area 175 and a number of mounting tabs 176 extending inwardly from the outer rub area 175. The tabs 176 have mounting openings 178 disposed opposite the rub area 175. The ring 168 is mounted to the carrier 166 by aligning the openings 178 on the tabs 176 with the openings 174 on the arms 172 and attaching the two together using rivets 180, or the like. As shown in FIGS. 11–13, rivets 180 are of a standard construction, having a tapered rivet head 181a disposed atop the rivet body 181b. The ring 168 also has a number of holes 179 oriented in a first direction that extend through the rub area 175. The holes 179 reduce the ring's weight and dissipate heat from the ring 175 during braking.

The central opening 170 in the sleeve 169 of the rotor carrier 166 has an inner diameter slightly greater than the outer diameter of the tubular portion 158 of the rotor mount 154. A number of axial splines 182 are spaced along the inner periphery of the sleeve 169. The splines 182 are shaped similarly to the splines 162 on the tubular portion 158. As a result, when the carrier 166 is properly aligned with the hub 144 and slid onto the tubular portion 158 of the hub 144, the splines 162 and 182 matingly engage one another to rotationally lock the carrier 166 to the hub 144. The splines 162 and 182 can have any desired shape, but are preferably wedge shaped or triangular in cross-section in order to most effectively facilitate the engagement of the carrier 166 with the rotor mount 154 of the hub 144.

The sleeve 169 of the carrier 166 also includes one or more of elongated arcuate slots 184 spaced axially inwardly from the mounting arms 172 in the inner end 185 of the sleeve 169. The slots 184 are located so as to positioned adjacent the radial portion 156 of the rotor mount 154 when the carrier 166 is properly mounted on the hub 144. Two circumferentially opposed slots 184 are provided in the illustrated embodiment. Each slot 184 extends completely through the sleeve 169 and is aligned with the groove 160 when the carrier 166 is inserted all of the way onto the mount 154.

Looking now at FIGS. 10, 14, 32–35, the retainer clip 186 is adapted to extend through the slots 184 and into the groove 160 to lock the carrier 166 from axial movement relative to the hub 144. The clip 186 is formed from a strong material such as spring steel. It preferably is a "wire form," i.e., a wire bent to the desired shape so as to have an inherent bias. As shown in FIGS. 32–35, it has a generally circular body portion 187 and a pair of ends 190 that extend outwardly from the body portion 187. The body portion 187 includes a pair of inwardly extending engaging portions 188 on opposite sides thereof that are positionable within the slots 184 in the carrier 166. The ends 190 are positioned at a common side of the body portion 187. They are bent relative to the body portion 187 and relative to one another such that they cross over one another and extend from the common side of the body portion 187 sufficiently far to permit the ends 190 to be engaged by a person's thumb and forefinger without interference from the body portion 187. Manual engagement may be facilitated by coating the ends 190 with rubber or plastic or by placing caps 200 (FIG. 10) over the ends 190. One of the ends 190 is formed with an axial offset 192 that permits the ends 190 to overlap one another. This overlap permits the ends 190 to move with respect to one another to increase or decrease the thickness of a gap "G" (FIG. 34) between the ends 190. Because the ends 190 extend from a common side of the body portion 187 and cross over one another, the diameter of the body portion 187 increases when the ends 190 are squeezed together against the inherent bias of the retainer clip 186 to decrease the thickness of the gap G. Conversely, the diameter of the body portion 187 decreases upon release of the ends 190 and a consequent increase of the thickness of the gap G. Hence, the engaging portions 188 can be driven into and out of the slots 184 and groove 160 simply by manipulating the ends 190 of the retainer clip 186.

In use, the retainer clip 186 is prepositioned on the rotor 124 by squeezing the ends 190 together, sliding the body portion 187 over the sleeve 169 from the sleeve's inner axial end, aligning the engaging portions 188 with the slots 184, and releasing the ends 190 to permit the engaging portions 188 to spring into the slots 184. This preassembly could be performed either at the factory or by the end-user. It requires no tools.

In order to mount the rotor 124 on the hub 144, the rotor 124 is positioned with the inner end of carrier sleeve 169 facing the mount 154 of the hub 144. There is no need to align the slots 184 in the carrier sleeve 169 with any particular circumferential portion of the hub 144 at this time because the groove 160, which ultimately will be engaged by the engaging portions 188 of the retainer clip body 187, extends around the entire outer periphery of the mount 154. The carrier 166 is then slid axially over the mount 154 from the mount's outer end (i.e., to the right in FIG. 10) with the splines 162 and 182 in mating engagement with one another. It may be necessary to squeeze the ends 190 of the retainer clip 186 to provide clearance for the engaging portions 188 to ride over the splines 162. However, it is conceivable that this squeezing requirement could be eliminated if the outer ends 160' (FIG. 39D) of the splines 162' are chamfered to present a ramped surface for the engaging portions 188 to ride along and expand the body portion 187 as the carrier 166 slides onto the mount 154. Even if it is necessary to squeeze the ends 190 together during the initial phase of the mounting process, the ends 190 can be released as soon as the engaging portions 188 are positioned around the splines 162, whereupon the engaging portions 188 will ride along the splines 162 during the remainder of the rotor carrier sliding process. When the carrier 166 is slid fully onto the mount 154 so that the slots 184 are axially aligned with the groove 160, the inherent biasing force of the retainer clip 186 drives the engaging portions 188 into the groove 160, hence locking the rotor 124 from axial movement relative to the hub 144. Subsequent limited relative movement or jostling of the carrier 166 with regard to the rotor mount 154 enables the engaging portions 188 to move further into the groove 160, tightening the engagement between the carrier 166 and the hub 144.

In order to remove the rotor 124 from the hub 144, all one needs to do is to squeeze the retainer clip ends 190 together to compress the thickness of the gap G sufficiently to increase the diameter D (FIG. 34) of the body portion 187 enough to drive the engaging portions 188 out of the groove 160 in the mount 154. This task can be performed with a person's thumb and forefinger with minimal effort. It typically requires less than ten lbs., and typically less than five lbs., of actuation force. Then, while holding ends 190 in their gap-compressing position, the person slides the rotor 124 axially outwardly relative to the hub 144 so that the slots 184 move out of axial alignment with the groove 160. The ends 190 of the clip 186 can then be released, and the user can then side the rotor 124 from the hub 144 without difficulty.

It can hence been seen that the novel rotor mounting arrangement permits a rotor 124 to be mounted onto and removed from a hub 144 with minimal effort and without any tools. Yet the retention forces provided by a fully-inserted clip 186 are very strong. In fact, the retainer clip 186 must be sheared to remove the rotor 124 from the hub 144 without first expanding the clip body portion 187. An axial force of at least 300 lb to 400 lb would have to be applied to the rotor 124 to shear the clip 186.

It can also be seen that the rotor 124 and its biased securing member (the retainer clip 186 in this embodiment) can be provided as a single one-piece preassembly, further facilitating assembly and minimizing the risk that parts will be lost during assembly and disassembly. These benefits are appreciated under all circumstances, but are particularly important under field replacement conditions. They are invaluable during competitive events, where speed and reliability are of the essence.

In operation, retainer clip or biased retaining member 186 may be used in a brake system including a brake rotor, a brake rotor carrier connected thereto and for engagement with a brake hub. The biased retaining member, since it has at least one section that is at least partially insertable into the brake rotor carrier for retaining the brake hub with respect to the brake rotor carrier when the biased retaining member is inserted and released, can be used to quickly retain the brake hub and brake rotor carrier combination. Advantageously, the biased retaining member is removable from the brake rotor carrier so as to release the retained brake hub from frictional contact with the retained brake hub by tool-free compression of the biased retaining member. The result is brake rotor carrier and rotor removal from the hub, as when a tire change or other repair necessitates separation of the rotor carrier from the brake hub.

Figure 36:
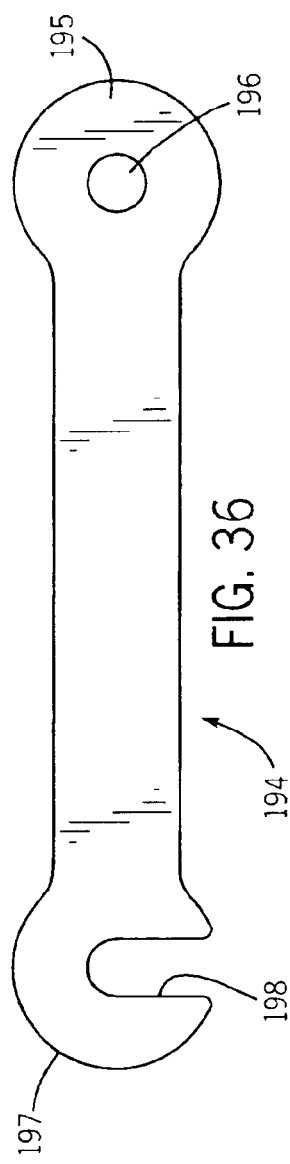
FIG. 36 is a front view of a locking bar for use in the disc brake assembly of the present invention.
Figure 37:
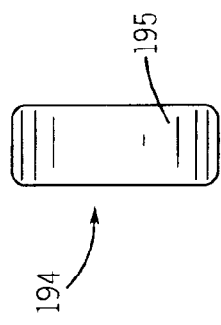
FIG. 37 is side view of the locking bar of FIG. 36.
Figure 38:
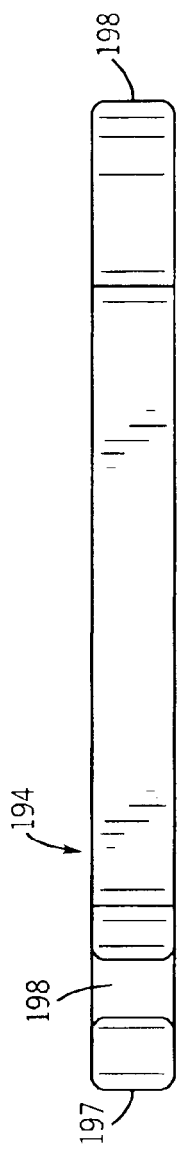
FIG. 38 is bottom view of the locking bar of FIG. 36.
Figure 41A:
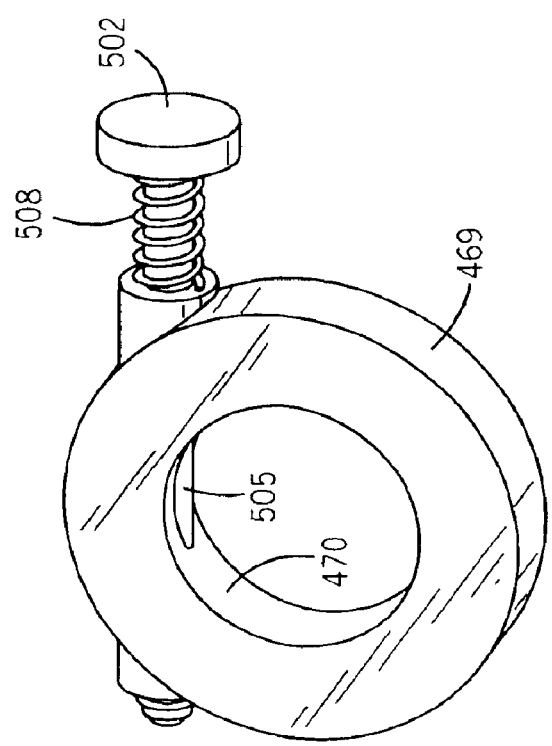
FIG. 41A is a front perspective view of the biased securing member.
Figure 40:
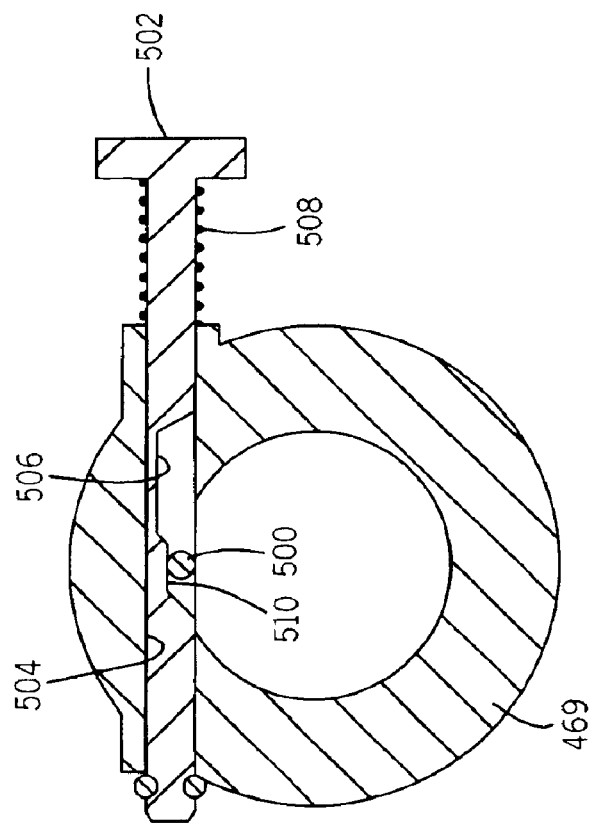
FIG. 40 is a front view of a second embodiment of a biased securing member.
Figure 41B:
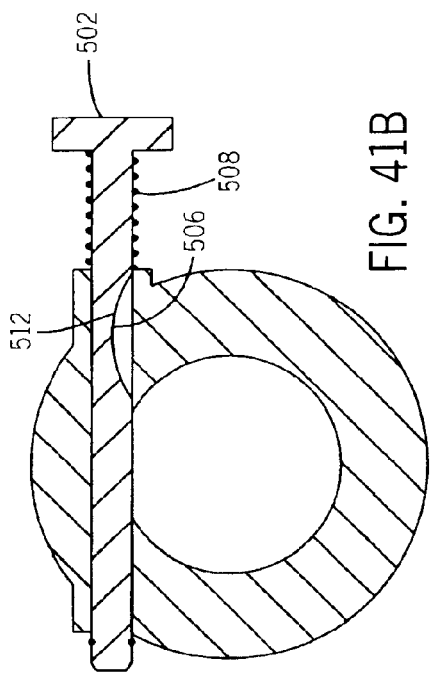
FIG. 41B is a cross sectional view of the biased securing member of FIG. 41A.
Figure 41C:
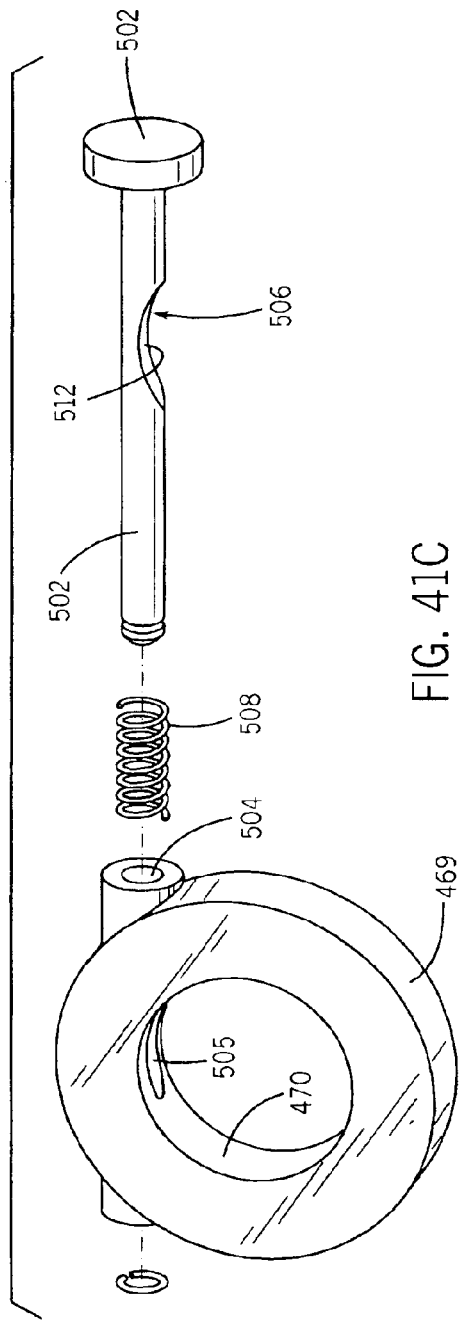
FIG. 41C is an perspective exploded view of the components of the biased securing member of FIG. 41A.

Referring now to FIGS. 36–38, in order to prevent the inadvertent disengagement of the retainer clip 186 by inadvertent contact with and/or movement of the clip ends 190 a locking bar 194 can be releasably secured between the ends 190. The locking bar 194 is formed of a rigid material, such as a metal or hard plastic. The illustrated embodiment is a so-called "dog bone" locking bar, having a first end 195 including an opening 196, and a second end 197 including a curved slot 198 opposite the first end 195. The opening 196 in the first end 195 preferably has a diameter approximately equal to the diameter of the ends 190 such that when the opening 196 snaps onto one of the ends 190 of the wire form 186 so as to permit the locking bar 194 to pivot around that end 190 such that the curved slot 198 in second end 197 of the locking bar 194 swings into and out of engagement with the opposed end 190 of the retainer clip 186, thereby fixing the respective positions of the ends 190 with regard to one another and preventing inadvertent compression of the gap G. The second end 197 of the locking bar 194 may also include a releasable closure or other mechanism (not shown) that covers the curved slot 198 when the end 190 is positioned therein.

Referring now to FIGS. 39A–39D, a second embodiment of a hub for use in the disc brake assembly of the present invention is shown. In this embodiment of the hub, an alternative spline configuration that is less sensitive to retainer clip wire form section peripheral geometry than that of the retainer clip 186 described herein to the extent that the outer axial edge 160' of the groove 160 is inclined, preferably at an angle of about 20° relative to the radial, to provide a better engagement surface for the edge of the retainer clip engaging portions. That surface is best seen in FIG. 39D.

Referring now to FIGS. 40 and 41A–41C, an alternative embodiment of a biased securing member is shown. In the embodiment shown, an alternative biased securing member in the form of a detent 500 is mounted in the sleeve 469 of a rotor carrier (not shown). The detent 500 is selectively forced into a groove (not shown) in the splined hub by a spring loaded engagement pin 502 inserted into a radial bore 504 that is formed in the sleeve 469. The bore 504 opens into the axial bore 470 in the carrier at 505. The pin 502 has a relief or notch 506 formed in it that engages detent 500. The pin 502 is normally biased by a spring 508 to a position in which the pin 502 drives the detent 500 downwardly into the groove in the rotor mount of the hub. The pin 502 can be driven to the left in FIG. 40, against the force of the spring 508, to permit the detent 500 to ride along the surface of the notch 506 and out of the groove in the rotor mount, at which time the rotor can be withdrawn from the hub. Different notch locations and geometries are possible (compare the stepped surface 510 in FIG. 40 to the curved surface 512 in FIGS. 41A–41C).

While the invention has been shown and described with respect to a specific embodiment, it is understood that various alternatives and modifications are contemplated as being within the scope of the invention. For example, and without limitation, the exact geometry, contours and curvature of the retainer clip or biased retaining member may vary. The retainer clip or biased retaining member may also be used with a rotor having a different design configuration than the embodiment shown. It is contemplated that the location or placement of the retainer arrangement can vary depending on a number of constraints, for example, the size and dimension (and in general the make and model) of the rotor and rotor carrier utilized. Thus, the changes in the exact location of the retainer arrangement are contemplated, provided that the retaining objectives are met.

Various alternatives and embodiments are contemplated as being within the scope of the following claims particularly pointing out and distinctly claiming the subject matter regarded as the invention.

What is claimed is:

1. A disc brake assembly comprising:
   a) a hub, having a rotor mount having at least one receptacle on an outer periphery thereof;
   b) a rotor assembly including a rotor carrier having a central sleeve defining an axial opening therein, a number of splines positioned around the opening and engageable with splines on the rotor mount, and at least one slot disposed on the sleeve and extending through the sleeve and into the opening;
   c) a biased retainer clip having a body portion positionable around the rotor carrier, the body portion including at least one inwardly extending engaging portion releasably securable within the slot of the rotor carrier and the receptacle of the rotor mount, and a pair of opposed ends that are movable with respect to one another to disengage the engagement portion from the slot and the receptacle.

2. The assembly of claim 1, wherein the body portion is generally circular in shape.

3. The assembly of claim 1, wherein the opposed ends are disposed in an overlapping configuration.

4. The assembly of claim 1, wherein the retainer clip is formed of a length of a rigid material bent to form the body portion, the engaging portion, and the opposed ends, and having an inherent bias that urges the clip to an unflexed state.

5. The assembly of claim 1, wherein the carrier has at least two opposed slots and the retainer clip body portion has at least two opposed inwardly extending engaging portions.

6. The assembly of claim 1, wherein the opposed ends are releasably connected to one another.

7. The assembly of claim 1, wherein the receptacle is a groove in the rotor mount.

8. A disc brake rotor comprising:
   a) a rotor carrier having a central sleeve defining an axial opening therein, a number of splines positioned around the opening and engageable with corresponding splines of a rotor mount of a hub, and at least one slot disposed on the sleeve and extending through the sleeve and into the opening;
   b) a biased retainer clip having a body portion positionable around the rotor carrier, the body portion including at least one inwardly extending engaging portion releasably securable within the slot of the rotor carrier and a receptacle on the hub, and a pair of opposed ends that are movable with respect to one another to disengage the engaging portion from the slot and the receptacle.

9. The rotor of claim 8, wherein the splines on the rotor carrier are oriented perpendicular to the groove.

10. The rotor of claim 8, wherein the splines are generally wedge-shaped.

11. The rotor of claim 8, further comprising a locking bar releasably connecting the pair of opposed ends on the retainer clip.

12. The rotor of claim 8, further comprising a ring spaced from the rotor carrier and presenting a rub area for engagement by a brake pad.

13. A method comprising the steps of:
   a) providing a disc brake assembly including a hub including a rotor mount having a number of splines and a receptacle on an outer periphery of the rotor mount inwardly of an outer axial end thereof, a rotor carrier having a central sleeve defining an axial opening therein, a number of splines positioned around the opening and engageable with the splines of the rotor mount, and at least one slot extending through the sleeve and into the opening, and a biased retainer clip having a body portion positionable around the rotor carrier, the body portion including at least one inwardly extending engaging portion that extends through the slot of the rotor carrier and into engagement with the receptacle;
   b) squeezing opposed ends of the retainer clip together to withdraw the engaging portion from the receptacle; and
   c) sliding a rotor axially from the hub.

14. The method of claim 13, wherein disengaging the biased retainer clip comprises urging the opposed ends of the clip towards one another against the bias of the clip.

15. The method of claim 13, further comprising disengaging a locking bar connecting the opposed ends of the clip prior to urging the opposed ends towards one another.

16. The method of claim 13, further comprising sliding the rotor onto the rotor mount by:
   a) aligning splines on the rotor with the splines on the rotor mount; and
   b) sliding the rotor carrier onto the rotor mount to align the slot in the carrier with the receptacle on the rotor mount.

17. The method of claim 13, further comprising reengaging the biased retainer clip with the hub by:
   a) aligning the engaging portion with the slot in the rotor carrier and the receptacle on the rotor mount; and
   b) allowing bias of the clip to drive the engaging portion into engagement with the receptacle.

18. The method of claim 13, further comprising locking the opposed ends with respect to one another after releasing the opposed ends.

19. The rotor of claim 8, wherein the rotor can be mounted on the hub and locked from axial movement with respect to the hub without using any tools.

20. The method of claim 13, further comprising:
   locking said rotor from axial movement relative to said hub by latching said retaining clip.

* * * * *